May 12, 1942.　　　J. A. KRATZ　　　2,282,522
ELECTRIC WELDING
Filed July 6, 1940
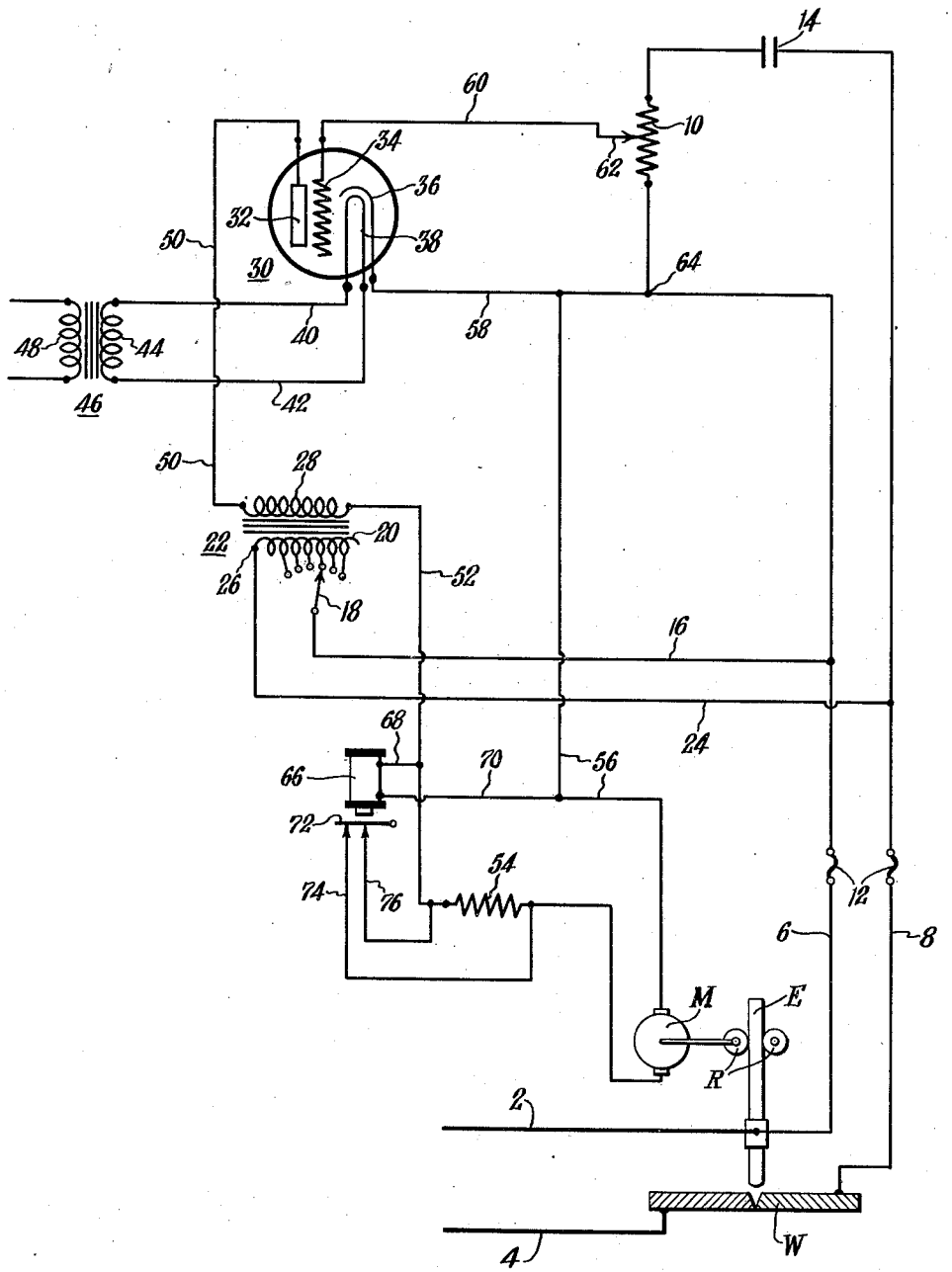
INVENTOR
JOHN A. KRATZ
BY
　*Ed Greenewald*
ATTORNEY Patented May 12, 1942

2,282,522

UNITED STATES PATENT OFFICE 2,282,522

ELECTRIC WELDING

John A. Kratz, Bronxville, N. Y., assignor to The Linde Air Products Company, a corporation of Ohio Application July 6, 1940, Serial No. 344,194

16 Claims. (Cl. 219—8)

This invention relates to automatic electric welding, and more particularly to an improved system for automatically controlling the feeding of a welding rod or electrode adapted to be fused and deposited upon the work which may constitute a cooperative electrode.

To produce strong welds of uniform quality, the amount and character of the fusion of the weld metal and the work must be accurately controlled. This may be done by maintaining the distance between the fusing end of the welding rod or electrode and the work at a substantially constant value. As the welding voltage is a function of the distance between the electrode and the work, variations in the welding voltage may be used to control the electrode feeding mechanism to maintain the spacing of the electrode from the work at the desired constant value.

This control by the welding voltage may be variously effected. In some welding systems, the excitation of the electrode feed motor has been varied by applying the welding voltage directly to the motor. Due to inertia of the motor, these systems do not respond quickly to sudden variations in the welding voltage. In other systems, a separate source of power is provided for the electrode feeding motor, and a grid-controlled rectifier tube or discharge device is used to vary the current to either the field or the armature of the motor, or to both. With the equipment used at present, this method is not entirely satisfactory as the tubes permit the flow of current only when the voltage of the grid relative to the cathode is less than a certain value called the critical value. This has necessitated the use of complicated systems for applying grid biasing voltages to the discharge devices to render the system responsive to increases in the welding voltage, whereby, when the welding voltage increases, the devices will permit current flow to the electrode feed motor to decrease the distance between the electrode and the work.

Furthermore, in these systems the speed of the electrode feeding motor is not varied in accordance with variations in the welding voltage above the critical grid voltage of the discharge devices. This factor, of course, decreases the sensitivity of response of the control system to changes in the welding voltage.

The principal objects of this invention are to provide an electric welding method and control system for sensitively maintaining the voltage across the welding zone at a substantially constant predetermined value; to provide a control system for the feeding mechanism of a welding electrode which is directly responsive to variations in the voltage at the welding zone to maintain the fusing end of the electrode at a substantially constant distance from the work to be welded; to provide a control system in which the feeding of the electrode to the work is controlled by one or more positive grid controlled space discharge devices responsive to variations in the voltage across the welding zone; to provide a control system in which a single power supply source is used for the welding operation and the electrode feeding mechanism; to provide a control system in which the speed of an electrode feeding mechanism is varied in accordance with variations in the welding voltage above the critical grid voltage of a space discharge device; and to provide a simplified automatic electric welding system which is relatively inexpensive to install and maintain.

These and other objects of the invention will in part be obvious and in part become apparent from the following description and accompanying drawing, in which the single figure diagrammatically illustrates an electric welding control system embodying the principles of the invention.

Generally speaking, in carrying out the principles of the invention, a single power supply source is used to supply single phase alternating current for the welding operation and to energize a feeding mechanism, such as a direct current motor, for advancing a fusible welding electrode toward the work to be welded. Rectified direct current energy for the feeding mechanism is supplied solely from the single alternating current supply source through one or more control devices, such as grid-controlled space discharge devices of the type which pass current when the positive potential of the grid with respect to the cathode exceeds a certain pre-selected value, hereinafter called the critical value. When the relatively positive potential of the grid is less than this critical value, no current flows through the power circuit for the electrode feeding mechanism.

Through suitable circuit connections, the welding voltage is impressed on the electrode feeding mechanism and at least a portion of the welding voltage is impressed between the grid and cathode of the space discharge device. Control means are provided in the circuit connections so that, if the welding voltage exceeds a predetermined value, the voltage impressed on the grid of the space discharge device will exceed the critical value. Any increase in the amount by which the welding voltage exceeds the critical voltage will also increase the potential impressed on the electrode feeding mechanism. Hence, when the distance between the fusible end of the electrode and the work increases, thus increasing the voltage drop in the welding zone, the space discharge device establishes the flow of electrical energy to the electrode feeding mechanism. The feeding mechanism thereby becomes operative to advance the electrode toward the work until the predetermined spacing is again attained. If the voltage drop across the welding zone continues to increase above the critical value of the grid voltage, the rate of feeding of the electrode will correspondingly increase. When the distance between the fusible end of the electrode and the work reaches its proper value, the potential impressed on the grid of the space discharge device becomes less than the critical value, and the power supply for the electrode feeding mechanism is interrupted. The space discharge device may be considered as an electric valve controlling the flow of direct current in the electrical circuit of the feeding mechanism, and thus affording a very sensitive control of the voltage drop across the welding zone and the distance between the fusible end of the electrode and the work.

Referring more particularly to the drawing, a fusible metal welding rod or electrode E is illustrated in operative relation to work W to be welded. An electrically operable feeding means for advancing the electrode E toward the work is illustrated as comprising a direct current electric motor M which actuates driving rollers R engaging the electrode. If desired, the motor M may actuate the rollers R through the medium of a speed reducing mechanism.

A single supply source for supplying current for the welding operation and power for energizing the feeding mechanism is illustrated as comprising conductors 2 and 4 electrically connected at one end, respectively, to the electrode E and the work W and constituting a welding circuit. At their other ends, these conductors may be connected through a suitable switch to a suitable source of alternating current power, such as a transformer or a welding current generator, which, for the sake of simplicity, has been omitted from the drawing.

To impress the welding voltage on the feeding mechanism, and to operatively associate the control circuit with the welding circuit, a pair of conductors 6 and 8 are connected at one end to electrode E and work W, respectively, and at the other end to opposite terminals of a voltage adjusting means 10, which is preferably an adjustable impedance or potentiometer. It will be noted that the impedance 10 is in parallel with the welding circuit. Fuses 12 may be provided in these conductors and a capacitance 14 may be inserted in series with conductor 8 for a purpose to be described hereinafter.

Electrical energy is conducted from the welding circuit to the electrode feeding mechanism by means of an energizing circuit including a conductor 16, connected at one end to conductor 6 and at the other to the adjustable terminal 18 of the tapped primary winding 20 of a transformer 22, and a conductor 24 connecting the fixed terminal 26 of winding 20 to conductor 8. The secondary winding 28 of transformer 22 is connected in series in the power circuit for motor M in a manner to be presently described. It will be noted that the winding 20 is in parallel with the welding circuit.

Rectified direct current for the electrode feeding mechanism is supplied by a space discharge device 30, such as a thyratron tube, comprising an anode 32, a grid 34 and a cathode 36. The cathode is of the type heated indirectly by a filament 38, connected by conductors 40 and 42 to the secondary winding 44 of a small filament-heating transformer 46. The primary winding 48 of transformer 46 may be supplied with alternating current from a suitable source, not shown, or may be connected to the conductors 2 and 4, if desired. The space discharge device is the positive grid controlled type which supplies direct current to the power circuit of the motor M when the relative positive potential of grid 34 with respect to cathode 36 exceeds a certain value called the critical value. When the relative positive potential of the grid with respect to the cathode is less than the critical value, the flow of current in the motor circuit is interrupted.

In order to supply direct current for the electrode feeding mechanism to control the operation of the feeding mechanism in accordance with variations in the distance between electrode E and work W, the space discharge device 30 is connected directly in series in the power circuit for motor M and the relative positive potential of grid 34 is made a function of the voltage drop across the welding zone. For these purposes, the anode or plate 32 of the space discharge device is connected directly to one terminal of the secondary winding 28 of transformer 22 by a conductor 50 and the opposite terminal of the secondary winding is connected to one side of motor M by a conductor 52. A resistance 54 is included in series with conductor 52 for a purpose to be described hereinafter. The opposite side of the motor is connected by conductors 56 and 58 to the cathode 36. Hence, when the space discharge device 30 is conditioned to pass current, a direct current voltage proportional to the welding voltage will be impressed on the motor M and the motor will advance electrode E toward work W. When the space discharge control device interrupts the flow of current, motor M and electrode E will be stationary.

To impress at least a portion of the voltage drop across the welding zone on the grid 34 and cathode 36, the grid is directly connected, by a conductor 60, to the adjustable tap 62 of potentiometer 10. Cathode 36 is directly connected by conductor 58 to one fixed terminal 64 of the potentiometer. Through the medium of conductors 6 and 8, the voltage drop across the welding zone is impressed on potentiometer 10, and by proper adjustment of tap 62, a proportionate amount of this voltage drop is impressed between grid 34 and cathode 36.

The critical value of the relative positive potential of grid 34 is known from the constants of the space discharge device. The voltage drop across the welding zone is a function of the distance between electrode E and work W. Hence, to maintain this distance at the predetermined value necessary to assure proper welding, the tap 62 is so adjusted that, under the desired conditions, the voltage impressed between grid 34 and cathode 36 will be not greater than the critical value.

Assume that the instantaneous direction of current flow through conductors 6 and 8 and resistance 10 is such that the potential of fixed terminal 64 is relatively negative with respect to the potential of tap 62, which condition occurs once during each current cycle. Under such conditions, if the electrode E and work W are properly spaced, the voltage drop between tap 62 and terminal 64 will be less than the critical, relatively positive potential of grid 34. This is true, of course, if the tap 62 has been adjusted in accordance with the predetermined voltage drop across the welding zone to maintain proper spacing of electrode E and work W.

Under these conditions, the device 30 will not supply rectified direct current and the motor M will remain inactive. As the electrode E is consumed, the spacing between its fusing end and the work W increases, increasing the voltage drop across the welding zone. Correspondingly, the relative positive potential of tap 62 with respect to terminal 64 increases, and when the potential impressed between grid 34 and cathode 36 exceeds the critical value, a direct current voltage proportional to the welding voltage will be impressed on the motor circuit through device 30. Motor M will then operate to advance electrode E toward work W until such time as the predetermined spacing has been re-established, when device 30 will again interrupt the current flow. If the spacing of the fusible end of the electrode from the work should continue to increase, the voltage drop across the welding zone will increase. Hence, the potential impressed on motor M will increase, increasing the rate of feeding of the electrode. Actually, the above described intermittent operation of the feeding mechanism occurs so frequently that electrode E appears to be advanced continuously toward work W as the electrode is consumed.

The purpose of the condenser or capacitance 14 is to reduce the welding voltage drop across impedance 10 and to change the phase angle of the impedance voltage drop so that the grid voltage will lead the plate voltage by approximately 45°. When the grid voltage is greater than the critical value, the tube will then pass current during the full half cycle during which the plate voltage is positive. If the grid voltage and plate voltage were in phase, the tube would not pass current during the first half of the positive half cycle of the anode or plate voltage.

The resistance 54 in the motor circuit protects the motor from excessive current when the voltage applied to the motor exceeds its rated value due to open circuit conditions or other factors. When the voltage applied to the motor is equal to or less than its rated voltage, the resistance 54 may be shunted by a relay 66. Relay 66 is connected by conductors 68 and 70 to the motor circuit conductors 52 and 56, respectively. If the applied motor voltage exceeds the rated voltage, relay 66 is energized to move its contact armature 72 out of operative relation with a pair of conductors 74 and 76 forming a normal shunt circuit for resistance 54. When the applied voltage is equal to or less than the rated voltage of motor M, resistance 54 is shunted by armature 72 and conductors 74 and 76.

From the foregoing it will be apparent that a simplified electric welding control system has been provided in which a proportionate part of the positive component of the welding voltage may be applied directly to the grid of a space discharge control device controlling the energization of the electrode feeding mechanism without requiring the complicated biasing circuits hitherto considered necessary. The single power supply source for the welding current, control apparatus and electrode feeding mechanism reduces the complexity of the system and increases its economy of installation and maintenance. As the motor M is responsive to variations in the welding voltage above the critical value of grid voltage, the sensitivity of the system is greatly enhanced.

While a specific embodiment of the invention has been disclosed to illustrate the principles of the invention, it is to be understood that the invention may be otherwise embodied within the scope of the appended claims.

What is claimed is:

1. An electric welding system comprising, in combination, a welding circuit including a movable electrode and the work; a source of electrical energy connected to said welding circuit; electrically operable means for feeding said electrode toward the work; means for conducting electrical energy from said welding circuit to said electrically operable means; and a control device, responsive to increases above a pre-selected value in the voltage drop between said electrode and the work, for establishing the flow of electrical energy to said electrically operable means.

2. In an electric welding system comprising the combination of a welding circuit, including a movable, fusible electrode and the work, and electrically operable means for advancing said electrode toward the work; the method of maintaining the fusible end of said electrode at a substantially constant distance from the work which comprises impressing the welding voltage on said electrically operable means and establishing the flow of energy to said electrically operable means only when the voltage of said welding circuit exceeds a pre-selected value.

3. In an electric welding system comprising the combination of a welding circuit, including a movable, fusible electrode and the work, and electrically operable means for advancing said electrode toward the work; the method of maintaining the fusible end of said electrode at a substantially constant distance from the work which comprises energizing said electrically operable means solely from said welding circuit and establishing the flow of energy to said electrically operable means only when the voltage of the welding circuit exceeds a pre-selected value.

4. An electric welding system comprising, in combination, a welding circuit including a movable electrode and the work, electrically operable means for advancing said electrode toward the work, said means receiving energy solely from said welding circuit; and a control device, operable to establish the flow of current to said means only when the welding voltage exceeds a pre-selected value.

5. An electric welding system comprising, in combination, a welding circuit including a movable electrode and the work; electrically operable means for advancing said electrode toward the work; an energizing circuit for said means connected in parallel with said welding circuit; and a device connected in series with said means and operative in response to increases in the welding voltage above a pre-selected value to control the energization of said means.

6. An electric welding system comprising, in combination, a welding circuit including a movable electrode and the work; electrically operable means for advancing said electrode toward the work; an energizing circuit for said means connected in parallel with said welding circuit;

a grid-controlled space discharge device connected in series with said means; and a circuit for impressing at least a portion of the welding voltage on the grid of said device to control the energization of said means.

7. An electric welding system comprising, in combination, a welding circuit including a movable electrode and the work; feeding means for advancing said electrode toward the work; a transformer; a circuit connecting the primary winding of said transformer in parallel with said welding circuit; a control device; a circuit connecting said control device and the secondary winding of said transformer in series with said feeding means; and a circuit for impressing at least a portion of the voltage of said welding circuit on said device to control the energization of said feeding means.

8. An electric welding system comprising, in combination, a welding circuit including a movable electrode and the work; electrically operable feeding means for advancing said electrode toward the work; means for energizing said feeding means solely from said welding circuit; a grid-controlled space discharge device in series with said feeding means; an impedance connected in parallel with said welding circuit; means for connecting a point of relatively positive potential on said impedance directly to the grid of said device; and means for connecting a point of relatively negative potential on said impedance directly to the cathode of said device.

9. An electric welding system as claimed in claim 8, in which said energizing means comprises a transformer having a primary winding connected in parallel with said welding circuit and a secondary winding connected in series with said feeding means and said device.

10. An electric welding system as claimed in claim 8, in which said impedance includes a pair of fixed terminals, one of which is connected to said movable electrode and the cathode of said device and the other of which is connected to the work; and an adjustable tap on said impedance connected directly to the grid of said device.

11. An electric welding system as claimed in claim 8, including means operative to change the phase angle of the voltage drop across said impedance so that the grid voltage will lead the plate voltage by approximately 45°, whereby, when the grid voltage exceeds the critical value, current will flow to said electrically operable feeding means throughout the full half cycle during which the plate voltage is relatively positive.

12. An electric welding system as claimed in claim 8, in which said energizing means comprises a transformer having an adjustable primary winding connected in parallel with said welding circuit and a fixed secondary winding connected in series with said feeding means and said device.

13. An electric welding system comprising, in combination, a welding circuit including a movable electrode and the work; electrically operable feeding means for advancing said electrode toward the work; means for energizing said feeding means solely from said welding circuit; a grid-controlled space discharge device connected in series with said feeding means; and means for impressing directly on the grid of said device a relatively positive potential proportional to the welding voltage.

14. An electric welding system as claimed in claim 13, including means operative to change the phase angle of the potential impressed on said grid so that it will lead the voltage impressed between the anode and cathode of said device an amount sufficient so that, when the grid voltage exceeds the critical value, current will flow to said electrically operable feeding means throughout the full half cycle during which the plate voltage is relatively positive.

15. An electric welding system comprising, in combination, a welding circuit including a movable electrode and the work; electrically operable means for advancing said electrode toward the work; means for impressing the welding voltage on said electrically operable means; and a control device operable to establish the flow of current to said electrically operable means only when the welding voltage exceeds a preselected value.

16. An electric welding system comprising, in combination, a welding circuit including a movable electrode and the work; electrically operable feeding means for advancing said electrode toward the work; means for impressing the welding voltage on said feeding means; a grid-controlled space discharge device connected in series with said feeding means; and means for impressing directly on the grid of said device a relatively positive potential proportional to the welding voltage.

JOHN A. KRATZ.